No. 700,965. Patented May 27, 1902.
F. A. MILLS.
PICKER STICK BUFFER FOR LOOMS.
(Application filed Oct. 29, 1901.)
(No Model.)
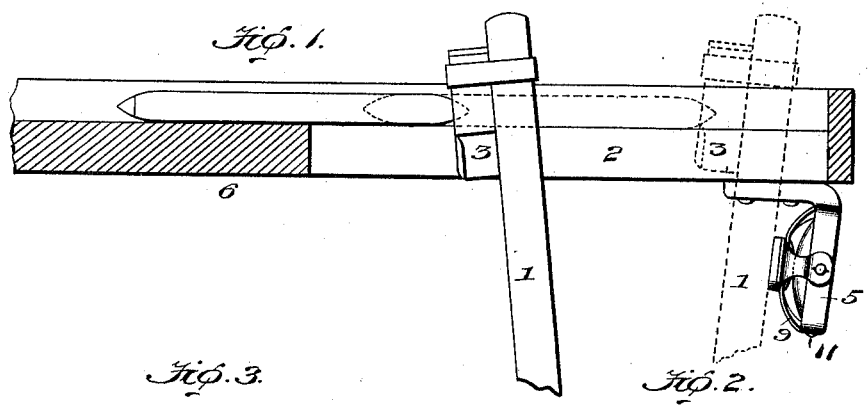
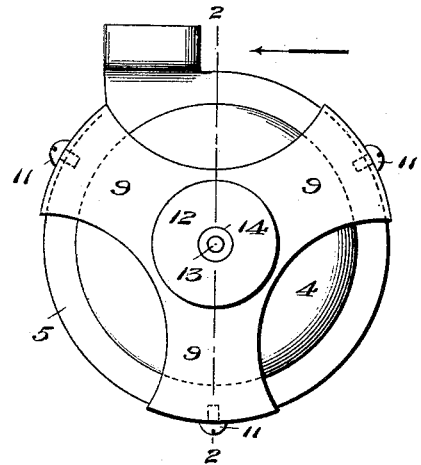
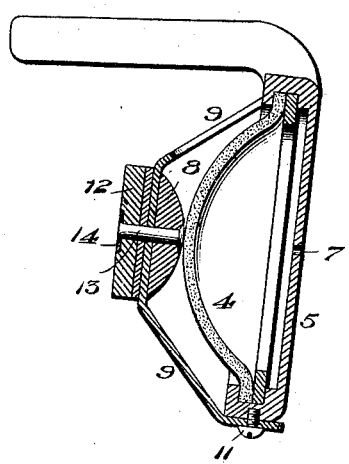
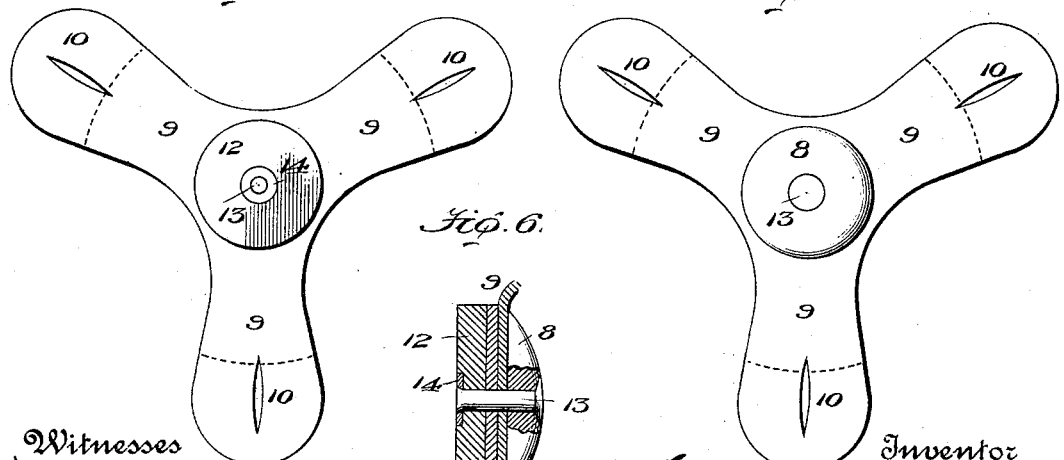
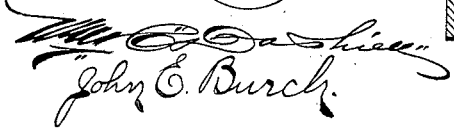
Witnesses
Inventor
Francis Arthur Mills
by Johnson and Johnson
Attorneys
THE NORRIS PETERS CO., PHOTO-LITHO., WASHINGTON, D. C.

UNITED STATES PATENT OFFICE.

FRANCIS ARTHUR MILLS, OF METHUEN, MASSACHUSETTS, ASSIGNOR OF ONE-HALF TO GROSVENOR B. EMMONS, OF METHUEN, MASSACHUSETTS.

PICKER-STICK BUFFER FOR LOOMS.

SPECIFICATION forming part of Letters Patent No. 700,965, dated May 27, 1902.

Application filed October 29, 1901. Serial No. 80,391. (No model.)

*To all whom it may concern:*

Be it known that I, FRANCIS ARTHUR MILLS, a citizen of the United States, residing at Methuen, in the county of Essex and State of Massachusetts, have invented certain new and useful Improvements in Buffers for the Picker-Sticks of Looms, of which the following is a specification.

In a patent granted to me December 25, 1900, for pneumatic shuttle and picker-staff buffer for looms is shown, described, and claimed a pneumatic rubber buffer arranged upon the race-lay and adapted to receive the direct impact of a hard button-bunter secured to and carried on the picker-stick. I have found that such direct impact of the hard button-bunter upon the rubber surface of the pneumatic buffer tends to and does rub or chafe and wears it. This not only results from the impact of the hard button, but from the freeness which the picker-stick has in its movements in the slot in the race-lay, which causes its button to strike with a slight sidewise action on the rubber at the moment of contact. Not only does my improvement avoid this damaging of the pneumatic buffer, but it provides a more important advantage by arranging the button-bunter as a fixed center upon the pneumatic rubber buffer, whereby the impact of the picker-stick is delivered upon the button, so that the latter becomes the means of receiving and delivering the impact centrally upon the pneumatic buffer without abrading effect. In this new combination of button-bunter with the pneumatic rubber buffer the trouble of placing the button-bunter in the precise place on the picker-stick so as to cause it to deliver its blow exactly upon the center of the crown pneumatic rubber buffer, of securing the button-bunter so that it cannot become loose on the picker-stick, and in the weakening of the stick in the fastening thereto of the button by boring holes in the stick are all avoided by the employment as a single device on the race-lay an unyielding button-bunter and a pneumatic rubber buffer, both having convex surfaces in perpetual contact.

The following description and the claims appended thereto, read in connection with the accompanying drawings, will particularly set out the parts and combinations of parts which constitute the invention.

In the drawings, Figure 1 shows so much of a race-lay and the picker-stick of a loom as illustrates the use therewith of my combined button-bunter and pneumatic rubber buffer employed as an entirety on the race-lay to receive the impact of the picker-stick and of the shuttle. Fig. 2 shows this combined button-bunter and buffer device in section. Fig. 3 is a face view of the same. Fig. 4 shows the outer face of the button-bunter and its keeper or holder part. Fig. 5 shows the inner face of the same. Fig. 6 shows enlarged in section the button-bunter constituting a receiving and a delivering face part.

The picker-stick 1 travels in the slot 2 of the race-lay and is provided with the usual picker 3 for throwing and for receiving the impact of the shuttle.

For cushioning the return of the picker-stick after having thrown the shuttle and for cushioning the impact of the shuttle upon the picker on the picker-stick when the latter is at rest the pneumatic rubber buffer 4 of my said patent is employed. As seen in Fig. 1, this rubber buffer is seated and sealed in a bracket or casing 5, attached to and depending from the end of the race-lay 6 in the path of the picker-stick and which forms an air-chamber behind the rubber buffer and into which chamber the buffer is collapsed without resilient effect by the impact of the picker-stick, and thereby prevents the rebound of the shuttle.

In the non-resilient action of the pneumatic rubber buffer a small vent 7 in the chamber-casing coöperates.

In Fig. 2 the pneumatic rubber buffer is shown in the form of a cup, preferably less than half a sphere, terminating in a base peripheral flange seated in a self-locking groove and forming thereby the air-chamber in perpetual communication with the air-vent. Supplementing the crown of this rubber cup is a button-bunter, on which the impact of the picker-stick is delivered with a non-resilient cushioning effect upon the picker-stick by reason of the yielding action of the rubber buffer and the perpetual contact therewith of the button-bunter. A button-bunter 8 of some unyielding material for this purpose has the form of a convex knob and is held centrally in contact with the crown of the rubber buffer, so that normally the rubber buffer maintains its arched or convex form. In this position the button-bunter is held by means of a keeper or holder, preferably of some flexible material, such as leather, and a simple form of such keeper is a piece of leather having finger branches 9, each finger having a buttonhole 10, by which it is looped or fastened over the head of a screw 11 in the rim of the seating-bracket of the pneumatic buffer. This keeper or holder is fastened on the outer flat side of the button-bunter, preferably by one or more leather disks 12, which supplements the button-bunter and, in fact, constitutes a part of it, the outer flat leather part 12 receiving the impact of the picker-stick and the inner convex unyielding part 8 delivering the impact of the picker-stick upon the crown of the pneumatic rubber buffer. These two button-bunter parts are therefore on opposite sides of the keeper or holder, and a simple means for fastening them together and to the keeper is a rivet 13, the outer end of which is clenched in a metal washer 14, sunk in the leather disk, whereby the receiving and the delivering bunter parts are centrally clamped together, while the keeper or holder retains this bunter device in position upon the crown of the pneumatic rubber buffer. This contact of the button-bunter and the pneumatic buffer will be maintained not only under the impact of the picker-stick in collapsing the pneumatic buffer, but in the return of the latter to its normal position, the bunter and the buffer parts moving together as a single device in which the maintenance of their contact is effected by the setting of the keeper of the button-bunter to the fixed bracket with respect to the arched surface of the pneumatic rubber buffer and the capacity of the keeper to move in and out with the button and the buffer.

Looking at Fig. 1, it is important to note that in the operation of the loom the picker-stick, as seen in dotted lines, lays against the flat receiving side of the button-bunter in receiving the impact of the picker-stick when the shuttle strikes the picker on the picker-stick, and in order that the flat side of the button-bunter will receive the flat side of the picker-stick flush with the full flat face of the button-bunter the bracket of the buffer device is set at a slight inward angle from a vertical line.

As shown, the hard button-bunter is riveted to three thicknesses of leather, which form the receiving impact part of the buffer device; but obviously the invention resides in supplementing the pneumatic buffer with a button-bunter however the latter may be constructed so long as it receives the impact of the picker-stick and serves as the medium of transmitting such impact to the rubber buffer. I have shown this combined bunter buffer device as applied at the end of the race-lay to cushion the outward throw of the picker-stick after having thrown the shuttle; but obviously this bunter buffer device may be applied at the inner end of the race-lay slot to cushion the shuttle-throwing blow of the picker-stick.

To maintain the contact of the button-bunter with the crown of the rubber buffer, it is important to note that the keeper or holder for the button-bunter must have a yielding or flexible function, so that the bunter and the buffer must yield together under the impact of the picker-stick caused by the impact of the shuttle. It is also important to note that the strap-keeper, together with its button and its disk, has a movement in a direction corresponding to the movement of the picker-stick, and that the disk has a flat surface to receive the impact of the picker-stick to prevent it from being broken under the force of the impact, and that such flat surface protects the rubber hemisphere from the direct blows of the picker-stick and from the destruction which would result from such direct contact, and that by its connection with the strap it is free to yield in any direction under the blow of the picker-stick.

I claim—

1. A buffer device for the picker-sticks of looms consisting of a pneumatic rubber buffer of hemispherical form, a holder therefor, a convex button contacting with the crown of the buffer, a flexible strap-keeper attached to the back of the button having branches extending over said buffer and fastened to the holder thereof around the base of the buffer, a leather disk forming a backing for said strap and a screw centrally fastening together the button, the strap and the leather disk.

2. A buffer device for the picker-sticks of looms consisting of a pneumatic rubber buffer of hemispherical form, a holder therefor, a convex button contacting with the crown of the buffer, and a strap-keeper for the button having branches extending over said buffer and fastened to the holder around the base of the buffer, a disk forming a backing for the strap to receive the impact of the picker-stick and means for centrally fastening the impact-disk to the button and its strap-keeper.

3. In a loom and in combination, the race-lay, the picker-stick, a bracket depending from the race-lay, a hemispherical rubber buffer seated in the bracket, a bunter consisting of a convex button contacting with the crown of the rubber buffer, a flat leather surface forming a backing for the button, a strap covering the buffer and having buttonholes for fastening it to and around the rim of the bracket, and means for securing the button and the impact flat surface centrally to the strap.

4. A bunter-buffer device for the picker-sticks of looms consisting of a pneumatic rubber buffer of hemispherical form, a convex knob, a leather disk or facing forming a backing for the knob, and a leather strap-holder for the knob and the disk permitting movement thereof in a direction corresponding to the direction of movement of the picker-stick.

5. A bunter for receiving the impact of the picker-sticks of looms consisting of a convex knob, a leather disk or facing supplementing the back of the knob and a flexible keeper or holder between the knob and the disk, and means for centrally fastening the parts together.

6. In a loom and in combination with the race-lay and the picker-stick, of a buffer device consisting of a bracket on the lay, an arched pneumatic rubber buffer, a convex button-bunter supplementing the crown of the rubber buffer and a flexible keeper or holder for maintaining the convex surfaces of the buffer and of the bunter in contact under the impact of the picker-stick.

In testimony whereof I affix my signature in presence of two witnesses.

FRANCIS ARTHUR MILLS.

Witnesses:
 ALFRED DOBSEN,
 DUNCAN WOOD.